Dec. 5, 1961   W. W. GARVIN   3,011,346
APPARATUS FOR GRAVITY GRADIENT SURVEYING
Filed July 11, 1957   2 Sheets-Sheet 1

INVENTOR
WALTER W. GARVIN
BY
ATTORNEYS

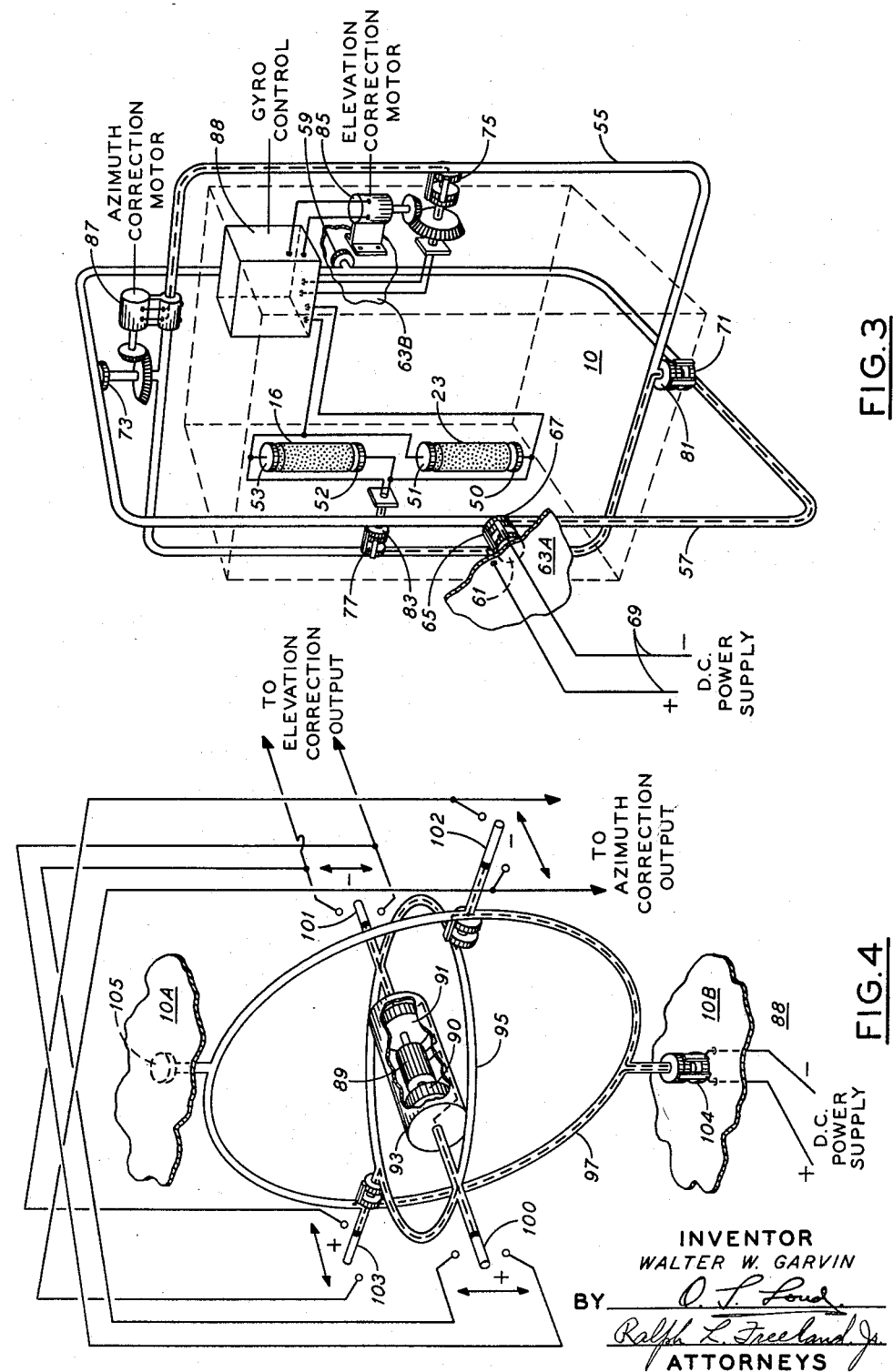

United States Patent Office 3,011,346
Patented Dec. 5, 1961

3,011,346
APPARATUS FOR GRAVITY GRADIENT
SURVEYING
Walter W. Garvin, Fullerton, Calif., assignor to California Research Corporation, San Francisco, Calif., a corporation of Delaware
Filed July 11, 1957, Ser. No. 671,230
8 Claims. (Cl. 73—382)

The present invention relates to gravitational surveying, and more particularly to apparatus for detecting lateral variations in the horizontal or vertical gradient of gravity.

The invention has for an object the provision of apparatus for measuring lateral and vertical variations in the gradient of the earth's gravitational field by detecting the difference in the refractive index of a fluid medium having particles suspended therein when the fluid medium and the particles are moved horizontally or vertically so that the suspended particles are subjected to variations in gravity gradient.

In a preferred form of apparatus carrying out the invention, said fluid medium contains a suspension of fine particles having a mass of between about $4 \times 10^{-17}$ grams and $4 \times 10^{-14}$ grams and changes in the gravitational effect on said particles is measured by determining the difference in refractive index of the fluid with an interferometer. Desirably, a pair of fluid tubes are vertically displaced from each other a sufficient distance so that a difference in the vertical component of gravity may be more readily detected. In said preferred manner of carrying out the invention, an electrostatic field is applied to the fluid suspension to reduce the tendency of the particles to settle out of the fluid. Additionally, the system is desirably maintained in a vertical position independently of the motion of a vehicle wherein the measurement is being made and changes in the vertical component of gravity are continuously recorded and correlated with the position of the vehicle relative to the earth's surface.

Three primary methods have been employed to determine gravity and gravity gradient in geophysical surveying. The first and most commonly employed method is that performed using one or more gravimeters which are essentially extremely sensitive weighing devices. In these devices the gravitational attraction on a known mass varies with the earth's gravitational field and said mass is generally supported by springs. Then, either the elongation of the spring, or the force required to return the mass to a null position is measured.

A second method, previously employed more widely than at the present time, involves the use of an Eötvös torsion balance. In general, this device comprises a pair of masses suspended by a sensitive torsion wire so that the masses are horizontally and vertically displaced from each other. The differences in the earth's gravitational attraction for these two masses causes differences in deflection of the torsion wire that can be measured. This apparatus is particularly useful to detect horizontal gravity gradient.

A third method frequently employed in gravity surveying includes measuring variations in gravitational acceleration as indicated by the period of a freely swinging pendulum. In this arrangement, the value of gravitational acceleration at any given location on the earth's surface may be determined from the known relationship between the length and period of the pendulum.

Other methods and apparatus have been proposed for determining the absolute value of gravity, such as by determining the gravitational acceleration for a freely falling body. Likewise, other methods for determining variations in the gravitational potential over the earth's surface have been suggested, but none of these previously proposed methods have been commercially successful in directly detecting and measuring changes in the gravity gradient.

It has long been appreciated that a knowledge of horizontal or vertical variations of this gradient over a given area would be a valuable aid in geophysical exploration. This is due to the fact that the horizontal and vertical variations of gravity gradients are useful in investigating individual features of a geological anomaly. Such structural anomalies can be closer together before they merge into one anomaly than on a map of absolute gravity values. Thus, the edges of a salt dome or a fault are more clearly defined than with simple differences in gravity measurements.

In addition such previously known methods and apparatus for indicating gravitational anomalies have the severe limitation of providing only widely spaced measurements at discrete points, or stations up to several miles apart on the earth's surface. Accordingly, the exact shape of a gravitational anomaly is not clearly defined. Each of these measurements additionally requires careful measurement of both latitude and elevation. The instruments utilized in previous methods of gravitational surveying are also susceptible to vertical and horizontal accelerations so that considerable time is consumed in making each measurement to prevent vibrations from masking any local anomaly that might be indicated by change in the gravity measurements. Accordingly, there has long been a desire for a method and apparatus capable of continuously indicating directly the gradient of gravity over a predetermined course. In particular, it has been desired to have a method of surveying which will permit measurement of gravity gradient from moving truck, boat or airplane.

In general, the present invention is directed to apparatus for geophysical exploration which detects the difference, or change, in the refractive index of a pair of fluid media having particles suspended therein when said fluid media are moved through a space having a varying gravitational field, said change in refractive index causing a change in the optical path length that can be measured by an interferometer.

Further objects and advantages of this invention will become apparent from the following description taken in conjunction with the accompanying drawings which constitute an integral part of this specification.

In the drawings:

FIG. 3 is a perspective view of a preferred form of the gravity gradient apparatus shown in FIGS. 1 and 2 mounted in a gyroscopically stabilized system for lateral movement in a vehicle such as a helicopter, airplane, or boat;

FIG. 4 is a schematic electrical circuit illustrating one form of a gyroscopic control means for the gravity gradient device shown in FIG. 3.

Figure 1:
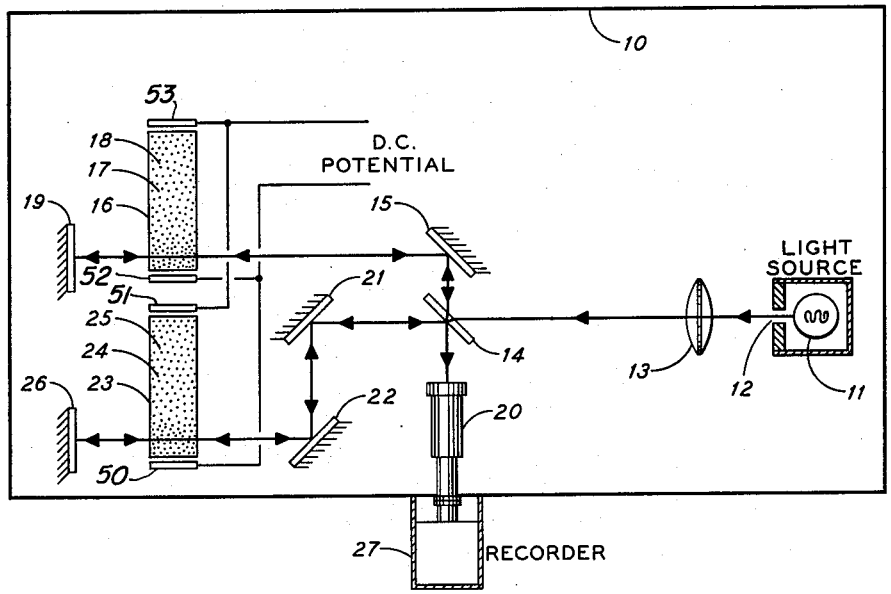
FIG. 1 is a schematic representation of one form of apparatus which may be used in carrying out the method of the present invention, and particularly illustrates a form of apparatus which may be used in determining changes in the gradient of gravity when the apparatus is moved through a space having a varying gravitational field.

Referring now to the drawings, and in particular to FIG. 1, there is shown a translucent tube 16, having any desired geometrical cross-sectional area and containing a suspension of fine particles, each having a mass of from about $4 \times 10^{-17}$ grams to $4 \times 10^{-14}$ grams in a fluid medium 18, such as water or any other transparent fluid. Tube 16 is vertically displaced from a similar transparent tube 23, likewise containing similar particles 24 in a similar fluid medium 25. Tubes 16 and 23 are mounted in a light tight box 10 and vertically displaced from one another so that the earth's gravitational field will act in a generally axial direction along the length of both tubes.

In accordance with the invention, the vertical component of gravity will act on individual particles 17 and 24 in each of the tubes 16 and 23, but the attraction of the earth's gravitational field for the particles will depend upon the vertical distance of the tubes from the earth. Change in such attraction in accordance with the present invention is measured by detecting a change in the index of refraction of the liquid containing the suspension of particles. This index of refraction is proportional to the volume concentration of the suspended particles in the fluids. Thus, there is detected change in the vertical component of gravity by measuring changes in the index of refraction when the tubes are moved. For this purpose, the index of refraction through similar portions of the tubes 16 and 23 is measured by an interferometer. The interferometer detects difference in optical path length of two portions of a light beam by measuring the movement of light fringes when either path length changes. Movement of reenforcing or dark light fringes past the eyepiece of a telescope, of course, depends upon change in optical length of the paths of two beams of light split for an original light source to pass through tubes 16 and 23.

The interferometer for detecting changes in the vertical component of gravity includes a monochromatic light source 11 within light tight box 10. Light from source 11 is collimated by a slitted opening 12 and condensing lens 13 throws a beam of monochromatic light onto a half silvered mirror 14. As illustrated, the light beam is then split by mirror means 14 and half of it strikes refracting mirror 15 so that this half of the light beam is reflected at a 90° angle to pass through the lower part of translucent tube 16. The optical path is transparent but the combined material in said path has an index of refraction that depends on the attraction of the earth's gravitational field on particles 17. After the light beam passes through tube 16, it strikes mirror means 19 and is reflected back along the same path. The other half of the original light beam is reflected through half silvered mirror 14 by mirror means 21 and 22 and passes through the lower end of transparent tube 23, fluid medium 25 and suspended particles 24 to strike a similar reflecting mirror 26. Mirror means 26 likewise returns the reflected beam back along the same path as the incident beam.

A change in the density of suspended particles in tubes 16 and 23 is then observed in telescope 20 which is capable of focusing the light fringes, set up by the interferometer system above-described, onto a cross-hair in the telescope. An indication of the shift in the light fringes may be detected on film by a motion picture camera, indicated generally as recorder 27.

In the operation of the arrangement of FIG. 1, the entire light tight box 10 is suitably supported to maintain tubes 16 and 23 substantially vertical with respect to each other while a reference is established. Then, if the box is moved either vertically or horizontally to a new position in earth's gravitational field, a change occurs in the optical path through tubes 16 and 23. The optical change results in the movement of light fringes that is detected at the telescope. A shift or movement of light fringes as the system is moved is directly correlated to the change in the gradient of gravity between the two locations. Such gradient measurement need only be relative in geophysical surveying, since the absolute value is of little aid in detecting changes in geological structure.

As shown, the two portions of the light beam are directed through the bottom part of each of the tubes 16 and 23 so that the change in the particle distribution in each tube is a maximum. Since distribution of the particles is nonuniform, more particles per unit volume are present near the bottom of the tube than near the top.

Figure 2:
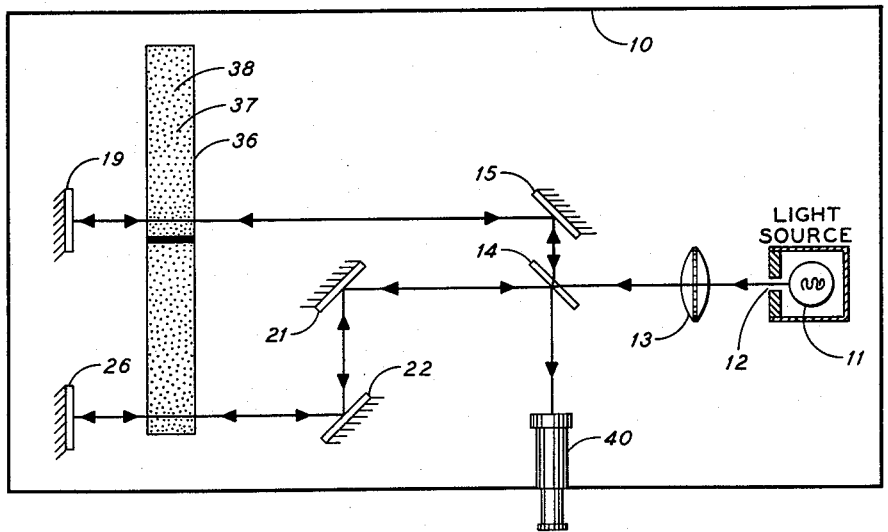
FIG. 2 is a schematic representation of an alternative form of apparatus according to the present invention which may be utilized in determining changes in the gradient of gravity when moved in a horizontal plane.

Referring now to FIG. 2, there is illustrated an alternative form of apparatus for practicing the method of the present invention wherein a single tube 36 contains a transparent fluid medium 37 and a dispersion of particles 38. The particles in the fluid suspension in the upper and lower parts of tube 36 are divided, as indicated, or the tube may be a single elongated cylinder. The measuring arrangement is substantially identical with that shown in FIG. 1, and includes the light source, collimating means and the mirror means for splitting a beam of monochromatic light into a pair of beams that can traverse the fluid dispersion at two vertically separated points and then is re-focused as a single beam, having an interfering wave pattern on telescope 40.

While not indicated in either of the arrangements in FIGS. 1 and 2, it is to be understood that there is provided means such as an aerial survey camera for correlating the actual position of the gravity gradient meter with respect to the traverse over the earth's surface. Thus, the measured gradient of gravity is recorded in accordance with the area surveyed.

Referring now to the arrangements of FIGS. 3 and 4, there is illustrated a commercial form of the apparatus shown schematically in FIGS. 1 and 2. In this arrangement, the gravity gradient measuring system is gyroscopically stabilized not only so that the fluid suspensiin tubes can be held in a vertical position, independently of horizontal or vertical displacement of the airplane, boat or automobile carrying it, but also to measure the centrifugal force on the fluid particles therein.

As illustrated, both of the two vertically displaced tubes 16 and 23 are subjected to an electrostatic field. This field is adjusted so that a portion of the earth's gravitational effect on the fluid particles that tends to settle them out of the fluid can be compensated, as required. While not illustrated in detail, said electrostatic field is applied by plates 50 and 51 to lower tube 23 and a similar field is applied by plates 52 ando 53 to upper tube 16. This electrostatic field may be applied either continuously by a D.C. source or as a pulsed D.C. signal to counterbalance a part of the gravity force acting on the particles. The particles will move in the fluid under such a field due to the effect known as cataphoresis.

In general, the gyroscopically stabilized system comprises a pair of yokes 55 and 57 that provide a universally gimbaled bearing structure. Universal supporting yokes 55 and 57 make possible movement of enclosing light tight box 10 to stay in a relatively true position in space. Such position will generally be such that box 10 is substantially parallel to the earth's surface and tubes 16 and 23 held not more than about 1° from true vertical to the earth's surface.

While the relatively vertical relationship between tubes 16 and 23 and the earth are important, the centrifugal forces acting on the fluid and particles is of greater importance. Such centrifugal forces will be applied by acceleration and deceleration of the vehicle carrying box 10. For this purpose, recording of changes in the index of refraction through said tubes is desirably restricted so that measurement thereof is made only when the particles in the tubes are not being subjected to such forces. Hence, the gyroscopic system illustrated in FIGS. 3 and 4 is adapted to detect both changes in position of the tubes and the rate of change of the angle of the box from any predetermined position. This may be accomplished by applying in gyro control 88 a follow-up system that recognizes the rate of departure of box 10, including tubes 16 and 23, from their given position. With such a system the recording camera can be interrupted when the unit is undergoing changes in angular velocity in space. Alternatively, the rate of change can be compensated by applying to box 10 an acceleration opposite in sense and magnitude to the angular disturbance of the system.

In correcting for positional and angular changes, outer yoke 57 of the gyro system is supported by a pair of bearings 59 and 61 that are mounted on a fixed part of the vehicle carrying the gravity gradient meter. This is indicated schematically in FIG. 3 by fragments of wall sections 63A and 63B. By supporting yoke, or frame, 57 on bearings 59 and 61, box 10 can be rotated through 360° about a normally horizontal axis, passing through the centers of bearings 59 and 61. Bearing 61 includes a slip ring and brush assembly indicated respectively as 65 and 67 to supply power to the gyro control system from lines 69. As indicated, the power supply is preferably a direct current, supplied by a battery or other portable D.C. source. To permit movement of box 10 about a normally vertical axis, an inner yoke 55 is supported on a pair of bearing members 71 and 73 that are respectively carried by opposite ends of yoke 57. Thus, the axis of rotation of yoke 55 is substantially 90° to the axis of rotation of yoke 57. Bearings 71 and 73 likewise permit 360° of rotation for yoke 55 and box 10 is in turn supported from yoke 55 by bearing members 75 and 77. For the purpose of providing power to gravity gradient meter both to energize the electrostatic field on tubes 16 and 23 and to drive the gyro control unit power for the entire assembly, power is transmitted through another slip ring assembly 81 associated with bearing 71 and a third slip ring 83 formed integrally with bearing 77.

While the entire assembly is free to rotate about bearing members 59 and 61, the actual position of box 10 in space is controlled by elevation correction motor 85 and azimuth correction motor 87, each located adjacent one of the corresponding bearing members 75 and 73. Motors 85 and 87 are desirably of the direct current type, wherein their field windings are energized by a polarized D.C. source but their armatures are interconnected through gyro control 88, so that the signal polarity will control the direction of rotation of the armature. The gearing between motors 85, 87 and bearings 75, 73 turn box 10 and the gravity gradient meter to a position such that gyro unit 88 is maintained at a null position.

The position and angular disturbance sensing device of gyro control unit 88 is illustrated schematically in FIG. 4. As there shown, said gyroscopic sensing unit comprises a drive motor 89 and a pair of fly wheels 90 and 91 that establish an initial, or reference, position in space for both the gyro control and support box 10. In FIG. 4 box 10 is designated by fragmentary parts 10A and 10B of the casing. Supporting case 93 for motor 89 and fly wheels 90 and 91 is mounted on a pair of rings 95 and 97. The combination of rings 95 and 97 is similar to yokes 55 and 57. Thus, universal movement of case 93 is possible, but such movement is restricted by electrical contact arms 100, 101, 102 and 103 that form reversing switches for power supplied to the correction motor armatures.

As shown specifically in FIG. 4, ring 95 directly supports the ends of case 93 and said ring would be free to rotate about a generally horizontal axis formed by bearings carried by outer ring 97. However, extension arms 100 and 101 on ring 95 engage respectively a set of electrical contacts that supply power to the armature of elevation correction motor 85 through a power amplifier and computer (not shown). Similarly, extension arms 102 and 103 formed on the outer ends of ring 97 prevent rotation of the outer ring about bearing members 104 and 105 supported by the casing walls, as indicated by segments 10B and 10A, respectively. Arms 102 and 103 complete an electrical circuit for corrective action at azimuth drive motor 87. Slip rings are likewise provided at bearing member 104 and the inner extension of arms 102 and 103 to conduct current between the inner structure, such as gyro motor 90 and the stationary walls 10A, 10B of box 10.

From the foregoing description it will be seen that a vehicle carrying a gravity gradient meter, constructed in accordance with the present invention, can move to any position in space relative the earth's surface from an initially horizontal and vertical position for tubes 16 and 23. For present purposes, box 10 is manually adjusted for initial vertical and horizontal alignment by use of a spirit level. The gyroscopic control system is then energized. Any movement of the supporting mechanism thereafter will first cause a small movement of supporting box 10. Such movement of box 10 in turn causes contact to be made between extension arms 100 and 101, or between 102 and 103, or both, and their associated electrical contacts. With any of said contacts closed, correction motors 85 and 87 can be energized to rotate box 10 in a direction and to an extent necessary for the gyroscopic control unit to attain a null position, with said extension arms between the fixed contacts. The speed of such correction is desirably such that vertical tubes 16 and 23 in general will be returned to their initial true-vertical position but without adverse angular acceleration so that differences of refractive index of the fluids in the two tubes can be measured as an indication of a change in the vertical component of gravity between an initial point and any subsequent location.

As indicated above, simple comparison of the index of refraction of the two fluids merely establishes a reference point from which departure can be measured whether the vertical component of gravity increases or decreases. Such change is recorded in accordance with the present invention by suitably coupling the optical equipment to an indicator so that the degree of change in said refractive indices can be recorded in correlation with the position of the gravity gradient system over the earth's surface. Suitable camera means, such as that indicated as recorder 27 in FIG. 1, are used to indicate said position and its relation to the light fringe movements detected by telescope 20 or 40, as in FIGS. 1 and 2, respectively.

Various modifications and changes in the control system can be made without departing from the invention as well as the method of recording the detected information, but it will be understood that any measurement of the change in refractive index of two portions of a fluid containing a suspension of fine particles and acted upon by gravity can be utilized for detecting horizontal and vertical variations in gravity gradient. All such modifications and changes falling within the scope of the appended claims are intended to be included therein.

I claim:

1. Vertical gravity gradient measuring apparatus for geophysical exploration comprising means for supporting an elongated column containing a fluid suspension in a vertical position, said fluid suspension containing particles having a different index of refraction than the carrier fluid, a monochromatic light source, means for directing a beam from said monochromatic light source over at least two vertically separated paths of substantially equal lengths through different portions of said column containing said suspension, means for reflecting said beams after traversal of said different portions to recombine said beams and means for detecting the phase shift between said reflected light beams as a measurement of the vertical gravity gradient of an area traversed by said apparatus.

2. Apparatus for gravity surveying comprising vertically disposed tube means, an optically transparent fluid within said tube means, a suspension of particles in said fluid, said particles having an index of refraction different from said fluid, means for directing a beam of light through at least two vertically displaced portions of said tube means, and an interferometer positioned to detect changes in the index of refraction of the fluid and particles through said vetrically displaced portions of said tube means as a measure of the vertical gravity gradient when said apparatus is moved.

3. A gravity gradient meter comprising a pair of vertically displaced translucent containers, a fluid medium within said containers capable of supporting a suspension of fine particles, said particles having an index of refraction greater than said fluid medium, and interferometer means for detecting changes in the index of refraction through said containers when said meter is moved in a horizontal plane as a measurement of the gravity gradient over said horizontal plane.

4. A gravity meter comprising an elongated translucent tube having a fluid therein, said fluid containing a dispersion of discrete particles having an index of refraction greater than said fluid, a monochromatic light source, means for simultaneously transmitting a light beam from said source transversely through said tube and to a reference mirror, other mirror means positioned on the opposite side of said tube to reflect said beam back along the same path through said tube, said reference mirror being positioned to combine the light beam incident thereon and the reflected beam from said other mirror means to produce an interference pattern, and means for detecting phase changes between said light beams when the index of refraction of said fluid is altered by movement of said gravity meter through a varying gravitational field.

5. A gravity meter comprising an elongated translucent tube having a fluid therein, said fluid containing a dispersion of discrete particles having an index of refraction greater than said fluid, a monochromatic light source, means for simultaneously transmitting a light beam from said source transversely through said tube and to a reference mirror, other mirror means positioned on the opposite side of said tube to reflect said beam back along the same path through said tube, said reference mirror being positioned to combine the light beam incident thereon and the reflected beam from said other mirror means to produce an interference pattern, means for detecting phase changes between said light beams when the index of refraction of said fluid is altered by movement of said tube in the earth's gravitational field, and means for maintaining said tube substantially vertical during movement thereof from a first position in space to a second position in space above the earth's surface.

6. A gravity meter comprising a source of monochromatic light, means for forming a beam of said light, optical means for splitting said beam, reflecting means positioned to receive a portion of said beam and reflect said beam, means for positioning a fluid suspension of particles in the path of another portion of said beam so that said particles may be subjected to the earth's gravitational field, second reflecting means for reflecting that portion of said beam passing through said suspension, means for causing the reflected beams from both of said reflecting means to arrive at a receiving means as a single beam, and means for recording the shift in interference fringes due to changes in the refractive index of said fluid suspension when said meter is moved from one location to another above the earth's surface whereby the gradient of gravity may be determined over the earth's surface.

7. Apparatus in accordance with claim 2 wherein said tube means comprises two vertically separated columns.

8. Apparatus in accordance with claim 2 wherein said tube means comprises a single vertically elongated column.

References Cited in the file of this patent
UNITED STATES PATENTS

| | | |
|---|---|---|
| 2,137,963 | Heiland | Nov. 22, 1938 |
| 2,256,855 | Zobel | Sept. 23, 1941 |

FOREIGN PATENTS

| | | |
|---|---|---|
| 924,173 | Germany | Feb. 25, 1955 |

OTHER REFERENCES

"A New Instrument for Measuring Very Small Differences In Gravity," by Kenneth Hartley, published in Physics, March 1932, volume 2.